INVENTORS
TADAO KOHASHI, TADAO NAKAMURA,
KUNIO NAKAMURA
BY Stevens, Davis, Miller & Mosher
ATTORNEYS INVENTORS
TADAO KOHASHI, TADAO NAKAMURA,
KUNIO NAKAMURA
BY Stevens, Davis, Miller & Mosher
ATTORNEYS

INVENTORS
TADAO KOHASHI, TADAO NAKAMURA,
KUNIO NAKAMURA

BY Stevens, Davis, Miller & Mosher
ATTORNEYS

United States Patent Office 3,446,963

Patented May 27, 1969

3,446,963

INFRARED IMAGE CONVERTING DEVICE WITH IMPROVED RESPONSE TIME

Tadao Kohashi, Yokohama, Tadao Nakamura, Kawasaki-shi, and Kunio Nakamura, Tokyo, Japan, assignors to Matsushita Electric Industrial Co., Ltd., Osaka, Japan, a corporation of Japan Filed Aug. 11, 1967, Ser. No. 660,104

Claims priority, application Japan, Aug. 15, 1966, 41/54,081; Oct. 27, 1966, 41/71,297, 41/71,309, 41/71,311

Int. Cl. G01t *1/00*

U.S. Cl. 250—83.3 9 Claims

ABSTRACT OF THE DISCLOSURE

This specification discloses a solid-state infrared image converting device utilizing infrared photoconduction quenching phenomenon, said device being adapted to rapidly eliminate the residual effect after the removal of infrared rays so that it can be used in the rapid changing of infrared images and the displaying of moving infrared images. Also, description is made of examples of a method of eliminating the residual effect produced in an converted image through irradiation of a visible light having a relatively high intensity and those of a device wherein a visible light having a relatively high intensity is irradiated for the purpose of eliminating the residual effect, and a residual photoconductivity persisting after interruption of said visible light is used as a bias photocurrent, so that a separate bias light source is eliminated.

This invention relates to an infrared image converting device utilizing infrared photoconduction quenching phenomenon, and more particularly it pertains to such device with an improved time response characteristic.

Infrared photoconduction quenching phenomenon refers to a phenomenon in which a photoconductivity excited by visible light or the like decreases with irradiation of infrared rays. Such phenomenon is observed in II–VI group compounds such as CdS or the like. The visible light for exciting the photoconductivity is herein termed "bias light".

It is well known in the art that an infrared image can be converted into a visible image by combining the phenomenon described above with an electroluminescent layer.

For example, by supplying power to electrodes which are so arranged as to connect an electroluminescent layer and an infrared photoconduction quenching layer equivalently in series or parallel with each other, supplying bias light from an external bias light source to said infrared photoconduction quenching layer to excite the photoconductivity of the latter, and thereafter projecting an infrared image onto said quenching layer, the photoconductivity of that portion of the quenching layer onto which is projected the infrared image is decreased due to the infrared photoconduction quenching effect, and a voltage impressed upon said electroluminescent layer is controlled in accordance with the variations in the photoconductivity of the quenching layer, so that a visible image is provided on the surface of the electroluminescent layer. The bias light source can be provided not externally but internally. This can be achieved either by feeding the light emitted by said electroluminescent layer in the absence of any projected infrared image back to the infrared photoconduction quenching layer as bias light or by providing a second separate electroluminescent layer serving as bias light source in addition to the aforementioned electroluminescent layer.

One of the greatest disadvantages of the aforementioned device is that an afterimage will be observed for several tens of seconds after the projection of an infrared image is ceased, due to the poor infrared quenching time recovery of the material in use after cessation of the projection of the infrared image. However, building up of a visible image converted from an infrared image is relatively quick.

By this afterimage, quick conversion of an infrared image and observation of a moving infrared image are very difficult to be carried out.

An object of this invention is to provide an infrared image converting device utilizing infrared photoconduction quenching, which is adapted for quick conversion of an infrared image and observation of a moving infrared image by promptly eliminating the afterimage of a converted visible image.

A further object of this invention is to eliminate the afterimage of a converted visible image by successively or intermittently applying a visible light having a higher intensity than the constant intensity of a bias light supplied from a bias light source. In the aforementioned system including an external bias light source, the afterimage eliminating light source can be provided separately. Alternatively, it can be used in common with the bias light source. It is also possible that the intensity of the aforementioned light source is increased through voltage regulation or the like. On the other hand, in a system including an internal bias light source composed of an electroluminescent material, such afterimage eliminating light source is externally provided.

Other objects, features and advantages of this invention will become apparent from the folowing description taken in conjunction of the accompanying drawings.

The principles of this invention will now be described. Normally, the infrared photoconduction quenching phenomenon is such that in the case of CdS representing a relatively great quenching action, for example, the build-up speed of the quenching action is high while the decay speed thereof is so low that several tens of seconds is needed. In the photoconduction phenomenon, the decay speed is rather higher than the build-up speed, as opposed to the quenching phenomenon. Furthermore, in the photoconduction phenomenon, the higher the intensity of irradiated light rays, the higher become the build-up and decay speeds.

Here, emphasis should be placed on the fact that the higher the bias light intensity, the lower becomes the infrared quenching efficiency. Such relation is illustrated in FIG. 1.

Figure 1:
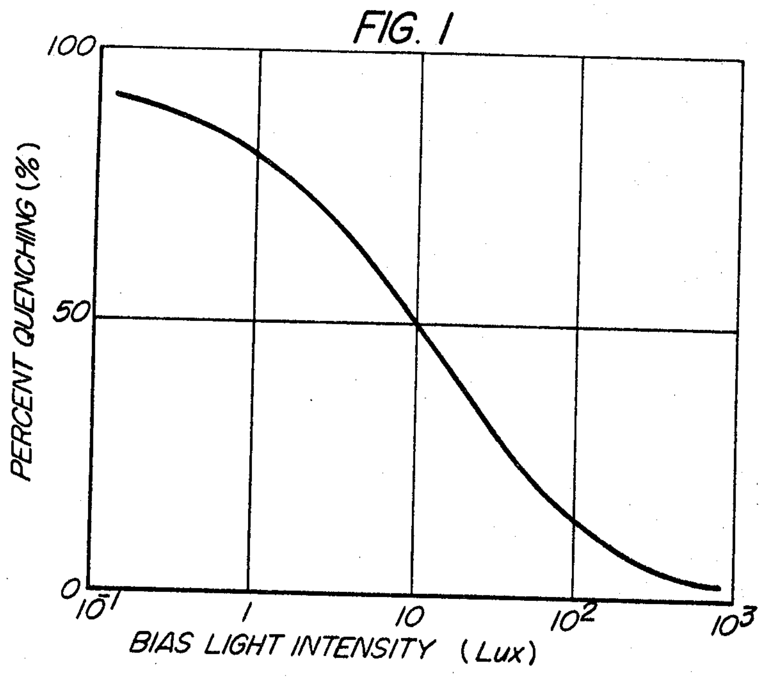
FIG. 1 is a view showing the percent quenching quantity representing the efficiency of an infrared photoconduction quenching as a function of the intensity of a bias light.

In FIG. 1 "percent quenching" refers to the infrared photoconduction quenching efficiency, which is represented by percentage of a current which is decreased through super-imposing irradiation of infrared rays with respect to a photo-current flowing during the irradiation of bias light. From this figure, it will be seen that the infrared photoconduction quenching efficiency is decreased with increase in the bias light intensity.

Now, consider the case where a photo-current caused to flow by irradiating a bias light of a constant intensity is decreased due to the quenching phenomenon which is caused by irradiating infrared rays. If the irradiation of the infrared rays is interrupted, it will take several tens of seconds for the decreased current to reach the original bias photocurrent level, as described above. However, by irradiating a light of a higher intensity immediately after the interruption of the infrared rays, the current quickly builds up in accordance with the characteristic of the photoconduction phenomenon. In such a state, the infrared quenching efficiency has been decreased. Thus, in effect, no quenching action is caused by suitably selecting the light intensity. This is quite obvious from the aforementioned dependence of infrared quenching efficiency upon light intensity. If said light is interrupted, the current likewise decreases sharply, and it assumes the initial level of the bias photo-current since the bias light is constantly irradiated.

Although several tens of seconds will normally be required for the bias photo-current level to be recovered after the interruption of infrared rays, such recovery can be achieved in a shorter time by the method described above. By suitably selecting the intensity of irradiated light and irradiating time, it is also possible to prevent a current caused by the irradiated light from assuming a level in excess of the bias photo-current level. In this way, there is provided an infrared image converting device utilizing infrared photoconduction quenching, which is adapted for quick conversion of an infrared image without producing any after-image.

In the foregoing, the principles of this invention have been described with respect to the case where an afterimage should be eliminated which tends to appear after interruption of infrared rays. However, even in the case where infrared rays are continuously irradiated without being interrupted, the desired operation can be performed on the basis of similar principles. Such operation can be effected by regularly or irregularly interrupting an irradiated light. By arridiating such light, the infrared quenching effect which has been produced immediately before such irradiation is decreased or in effect exterminated, so that no prior memory is left after such irradiation is carried out.

By intermittently irradiating an afterimage eliminating light at suitable intervals, at least an image produced in one interval is prevented from appearing in the subsequent interval, so that conversion of a moving infrared image and display thereof become possible. Concrete description will now be made of embodiments of the present invention.

*Example 1*

Figure 2:
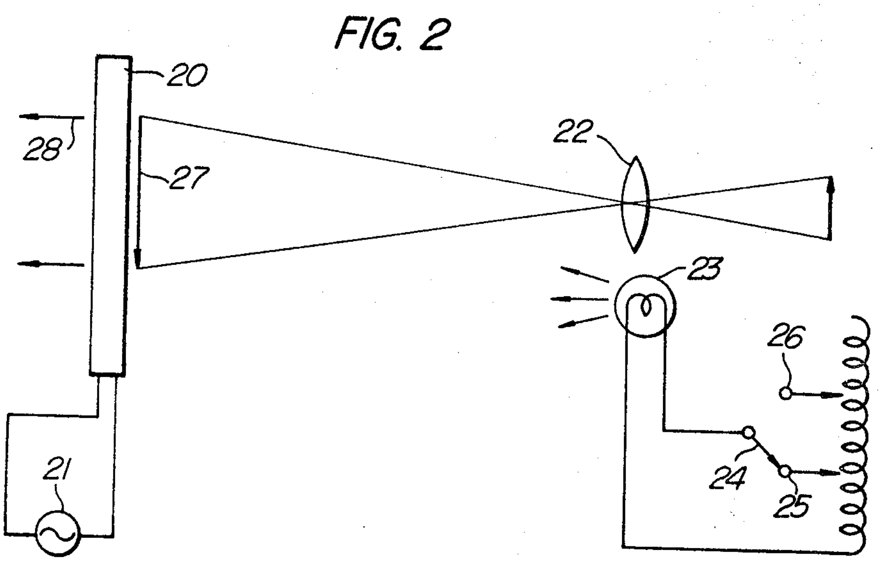
FIG. 2 is a schematic view showing the infrared image converting device according to an embodiment of this invention.

FIG. 2 shows an example of the infrared image converting device according to this invention, which includes an external bias light source which also serves as an afterimage eliminating light source. Referring to FIG. 2, the reference numeral 20 represents an infrared image converting device utilizing the infrared photoconduction quenching phenomenon described above, and 21 an A.C. power source. The reference numeral 23 indicates a lamp which serves as a light source for supplying a bias light and an afterimage eliminating light. This lamp 23 is switchingly connected with voltage supply terminal 25 or 26 providing a different voltage by means of a switch 24. The terminals 25 and 26 are variable terminals connected with secondary side of a transformer. If the switch 24 is connected with the terminal 25, the lamp 23 emits a bias light of a constant intensity, while if the switch 24 is connected with the terminal 26, the lamp emits an afterimage eliminating light having a higher intensity than that of the bias light.

When the bias light is supplied by connecting the switch 24 with the terminal 25, the infrared image converting device 20 is operated by means of the A.C. power source 21. An infrared image 27 is projected onto the device 20 through an optical system 22 so as to be converted into an output visible image 28.

Elimination of the afterimage of the converted image is effected by changing over the switch 24 to the terminal 26. In the case of moving infrared images, the switch 24 is alternately changed over to the terminals 25 and 26.

*Example 2*

In an infrared image converting device including an internal bias light source composed of an electroluminescent layer, use may be made of a light source including an on-off switch or a light interrupting optical filter as an afterimage eliminating light source. This results in effective conversion of the afterimage of a moving image.

*Example 3*

Figures 3, 4, 7:
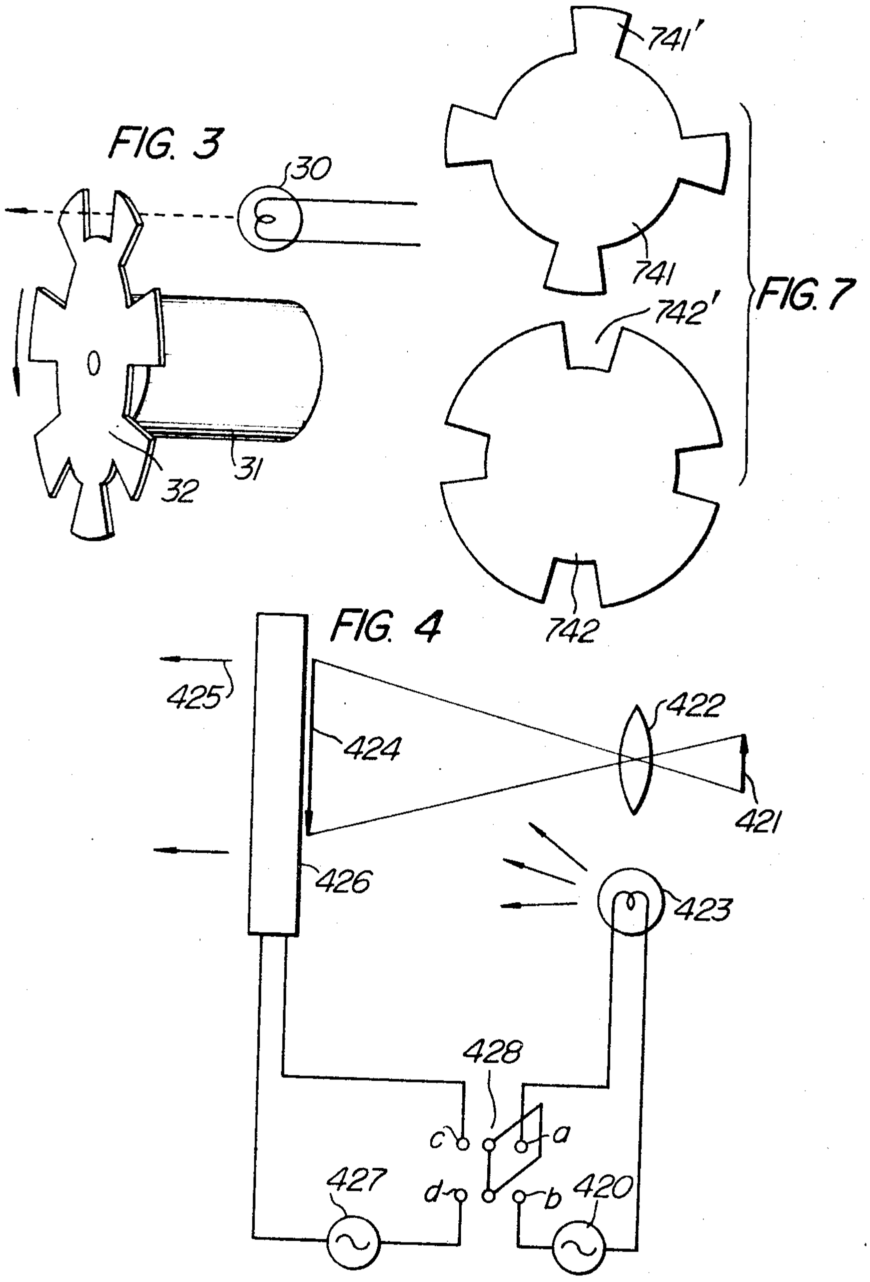
FIG. 3 is a view showing the major portion of another embodiment of this invention.
FIGS. 4, 5, 6 and 7 are schematic views showing other embodiments of this invention each adapted for performing additional functions.

FIG. 3 shows an afterimage eliminating light source provided with an optical chopper.

The afterimage eliminating light from the light source 30 is converted into an interrupted light by means of a slitted disk 32 driven by a motor 31. By using this light source, a moving infrared image can be displayed without any afterimage on an infrared image converting device which includes an external bias light source or an internal electroluminescent layer serving as a bias light source. The light source is not limited to one provided with such an optical chopper. By using as the light source a stroboscope capable of emitting a continuous light or an interrupted light, it is also possible to obtain good results.

In the afterimage eliminating system described above, it happens that infrared image is not temporally displayed during an irradiation of the eliminating visible light. That is, since the photoconduction quenching phenomenon decreases with increase in the bias light intensity as shown in FIG. 1, no quenching phenomenon occurs when a strong visible light is irradiated, so that there is produced no converted image. Thus, when the infrared image converting device is operating to display an output image of which the polarity is negative with respect to an infrared image, a bright blank scene appears during elimination of an afterimage, causing flicker. Such bright blank scene frequently appears at a higher frequency of interruption of the afterimage eliminating visible light, with a result that the white-to-black ratio of a converted image is decreased. Such drawbacks can be eliminated by stopping the power supply to the solid-state infrared image converting device described above during the irradiation of an afterimage eliminating light. Description will now be made of examples.

*Example 4*

FIG. 4 illustrates an example of the method of eliminating the effect of an afterimage eliminating light on an output image. Referring to FIG. 4, the reference numeral 426 represents an infrared image converting element using infrared photoconduction quenching described above, which includes at least a quenching photoconductive and an electroluminescent elements. The reference numeral 427 indicates an A.C. power source for supplying power to the converting element 426, and 423 an external light source to be used for eliminating the afterimage of an output image, which is connected with a power source 420 through a switch 428.

The light source 423 and the power source 420 are connected in series with each other between terminals *a* and *b* of the switch 428, and the infrared image converting element and a driving power source 427 are connected in series with each other between other terminals *c* and *d* of the switch 428. In this figure, a light source for providing bias light is not shown. By falling the switch 428 rightward to short-circuit the terminals *a* and *b*, a strong visible light is irradiated from the light source 423 onto the converting element 426, so that an afterimage is quickly eliminated. At this time, since the terminals $c$ and $d$ are not short-circuited, the power supply to the converting element 426 is interrupted, so that the screen becomes dark, thereby preventing deterioration in the quality of a picture due to bright light emitted when no eliminating light is irradiated. Next, by falling the switch 428 leftward to short-circuit the terminals $c$ and $d$, a voltage is applied from the power source 427 to the converting element 426, so that visible output light rays 425 are produced which correspond to an infrared image 424 formed on the light receiving surface of the converting element 426 by projecting an infrared image 421 thereonto through an optical system 422. In this case, the afterimage has already been eliminated by the operation described above. Thus, the incident infrared image is converted into a visible image having an excellent white-to-black ratio. By increasing the switching speed of the switch 428, even a fast-moving infrared image can also readily be converted into a visible image.

*Example 5*

Figures 5, 6:
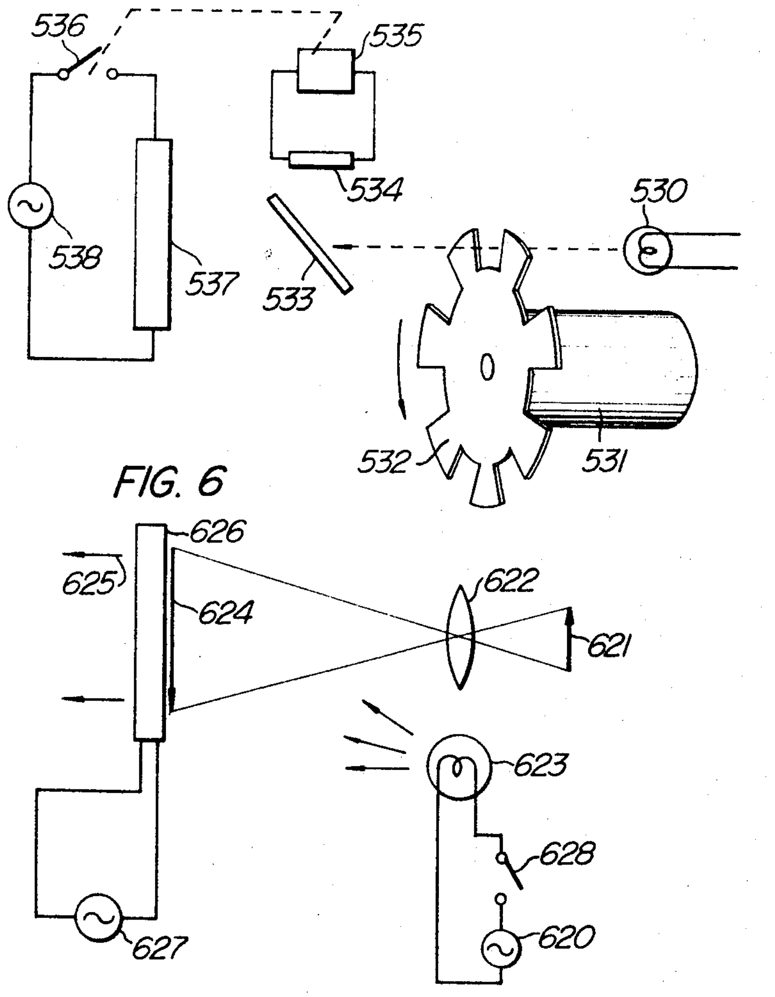

FIG. 5 shows still another embodiment. The reference numeral 532 represents a rotary slitted disk, which is driven by means of a motor 531. A light from an eliminating light source 530 is converted into an interrupted light by means of the rotary slitted disk 532, and the interrupted light is projected onto an infrared converting element 537 through a half-mirror 533 (a bias light source is not shown).

The light reflected by the half-mirror 533 is irradiated onto a photocell 534 connected with a relay coil 535, which is in turn operated with the resulting photo-electromotive force of the photocell, thereby opening a contact 536 connected between the converting element 537 and a driving power source 538. During the time that no quenching phenomenon occurs so that a uniform luminescence is produced by the display panel when a light is reflected by the half-mirror 533, that is, when a light is projected from the eliminating light source 530 onto the converting element 537, no voltage is applied from the power source 538 to the converting element 537, so that the element does not operate, as is the case with the foregoing embodiment. On the other hand, during the time that the light from the eliminating light source 530 is interrupted by the slitted disk, the photo-cell 534 is not excited and the relay 534 is not operated. Thus the contact 536 is kept closed so that a voltage is applied from the power source 538 to the converting element 537, thereby causing the latter to be operated.

By controlling the number of revolutions of the motor 531, it is possible to attain a fliskerless visual display of a moving infrared image.

As the means for providing an interrupted light, use may be made of not only a choper but also stroboscope capable of emitting a normal continuous light or an interrupted light.

However, when any of the foregoing embodiments is applied to an infrared image converting device requiring an external bias light source, there occurs such trouble that it is required that a light of a higher intensity be intermittently or temporarily added to the bias light of which the intensity is always kept constant. The below-mentioned embodiment is directed to a simplified device of this type which is free from such intricacy of the external light supplying means and adapted for quick elimination of an afterimage.

It is already known that in general, the higher the intensity of an incident light, the faster becomes the time response of a photo-current in a photoconductive material. However, even if use is made of an incident light of a higher intensity, a residual photo-current of a low level is detected for several minutes after the irradiation of the light is ceased. That is, although the changing rate of current with respect to time is high immediately after the irradiation of light is ceased, it becomes lower as time lapses. This means that a point coresponding to the attenuation level by a factor of $1/e$ or the like which defines the time constant is quickly reached while a relatively longer time is required for a still lower attenuation level than that by the factor of $1/e$ to be reached. By setting the operating conditions of the infrared quenching image converting device so that the residual photo-current level described above becomes the optimum bias photo-current level, it is possible to eliminate the necessity for providing a separate external bias light source.

The infrared quenching image converting device according to this embodiment is characterized in that the afore-mentioned low level a residual photoconductivity persisting for several minutes after the continuous or temporary irradiation of a visible light of a high intensity (for elimination of an afterimage) is used instead of a photoconductivity which is normally excited by a bias light so that a bias light supplying means is eliminated which have conventionally been required, thereby simplifying the afterimage eliminating means. Although it will take several tens of seconds for the bias photo-current to recover the original level when infrared rays are interrupted by quenching as described above, the current is caused to quickly build up by irradiating a visible light of a high intensity immediately after the interruption of the infrared rays. By suitably selecting the higher light intensity, no quenching phenomenon occurs in effect even if infrared rays are superimposed upon the light. Upon interruption of the aforementioned strong light, the residual photoconduction phenomenon will provide the bias photo-current, and a quenching image will be produced if infrared rays are projected. That is, by suitably selecting the intensity and irradiating time of the strong light, upon interruption of the strong light there will be produced a quenching image when only infrared rays are irradiated in absence of any bias light of a constant intensity. When a visible light of a suitable intensity is intermittently irradiated, a quenching image appearing after one light pulse has been projected will possess no memory of the image which was caused by the preceding light pulse. Therefore, a quenching image can be converted and shifted by suitably effecting the light interruption. While a strong visible light is being irradiated, the photo-current has so high a level that no quenching phenomenon occurs. Hence, no quenching image will be produced by constantly irradiating infrared rays. After the visible light is interrupted, the photo-current will decrease down to a suitable level to cause quenching phenomenon. Thus there will appear a visible image which will persist for several minutes while the current is assuming the level described above. Then, in the infrared image converting device of this type, still images can be also viewed continuously by irradiating a strong visible light once every several minutes. Furthermore, infrared rays (image) may be either constantly irradiated or interrupted when a quenching image eliminating light is irradiated.

In an attempt to display moving infrared images, the frequency of irradiation of a strong visible light is increased, so that a motion picture moving at a speed corresponding to the frequency will be displayed. Description will now be made of an embodiment.

Example 6

FIG. 6 shows the infrared image converting device according to a still further embodiment of this invention. In this figure, the reference numeral 626 represents an infrared image converting element utilizing infrared photo-conduction quenching as described above, and 627 an A.C. power source. The reference numeral 623 indicates an external light source which serves to eliminate an afterimage and supply a bias photo-current resulting from a residual photo-conductivity. The reference numeral 620 denotes a power source for said light source, and 628 a switch for turning on and off the light source 623.

Power is supplied from the A.C. power source 627 to the infrared image converting element 626 so that the latter is operated. An infrared image 624 of an object 621 is projected onto the light receiving surface of the converting element through an optical system 622. At this time, the switch 628 is opened so that a bias current suitable to cause photoconduction quenching flows through the element, whereupon an output visible image 625 is produced due to the infrared photoconduction quenching phenomenon. The afterimage of the converted image is eliminated by closing the switch 628. In the case of moving infrared images, the switch 628 may be repeatedly opened and closed by means of a continuously operable on-off contact or the like.

In the foregoing embodiment, use may be made of such a light interrupting optical shutter as shown in FIG. 3 in place of the on-off switch. Such optical shutter is provided in front of the light source 623, whereby a similar operation can be performed.

In this case, irradiation of infrared rays is interrupted during the elimination of an afterimage so that the eliminating light can effectively be used, by providing the afterimage eliminating and bias light supplying light source behind a slitted disk 742 in FIG. 7 provided with slit portions 742', providing an infrared image source to be converted into visible light rays behind a disk 741 having light interrupting projections 741' formed in positions corresponding to the slit portions of said slitted disk 742, and rotating said disks at the same speed so that said slit portions 742' and said projections 741' are in synchronism with each other so as to interrupt the infrared rays during the irradiation of visible light rays, and interrupt the visible light rays during the irradiation of the infrared rays. Thus, moving infared images can be converted into visible images by the aforementioned device.

Although the use of the various embodiments of this invention described above depends entirely upon their intended applications, it is quite apparent from the spirit of the present invention that these embodiments find effective use not only in constructing an infrared image converting device but also in eliminating the residual effect produced in an infrared photoconduction converting element during interruption of infrared rays. Furthermore, various modifications to the aforementioned embodiments will become apparent to those skilled in the art within the spirit and scope of the present invention.

As described, in accordance with the present invention, there is provided an infrared image converting system capable of causing the quenching phenomenon to rapidly build up thereby producing a converted visible image without causing any afterimage when an infrared image is changed or moved by changing or moving an object or infrared image converting device per se. Thus the system of this invention can effectively be applied to a dark field viewer, medical infrared viewing device, etc.

What is claimed is:

1. In an infrared image converting device with improved response time comprising a silod-state infrared image converter including an electroluminescent layer and in infrared photoconduction quenching layer, a power supply operatively connected for driving said image converter, means for exciting bias photocurrent for said infrared photoconduction quenching layer and means for projecting the infrared image to be converted on said infrared photoconduction quenching layer, and means for projecting an afterimage-eliminating light on said quenching layer for imparting a photo-current larger than said bias photocurrent.

2. An infrared image converting device as defined in claim 1, wherein said bias photo-current is produced by bias visible light projected on said quenching layer from a light source, and the afterimage-eliminating light projected on said quenching layer as an intensity higher than that of said bias visible light.

3. An infrared image converting device as defined in claim 2, further comprising means for selectively projecting said afterimage-eliminating visible light temporarily and intermittently and means for interrupting said power supply to said infrared image converter during projection of said afterimage-eliminating visible light.

4. An infrared image converting device as defined in claim 2, wherein the bias visible light and the afterimage-eliminating light are projected from a signle light source, the intensity of the light being controllable.

5. An infrared image converting device as defined in claim 2, wherein said afterimage-eliminating light is intermittently visible light projected through an optical chopper.

6. An infrared image converting device as defined in claim 5, further comprising photoelectric transducer means for detecting the light projected through said optical chopper and for controlling a switch which controls the power supply to said image converting element.

7. An infrared image converting device as defined in claim 1, wherein said afterimage-eliminating light is a visible light and a residual photo-current which flows through said quenching layer after said afterimage-eliminating light has been removed is utilized as the bias photocurrent.

8. An infrared image converting device as defined in claim 7, further comprising means for interrupting the infrared image to be converted during projection of said afterimage-eliminating light.

9. An infrared image converting device as defined in claim 8, wherein said means for interrupting the infrared image during projection of said afterimage-eliminating light consists of a pair of optical choppers which operates in synchronization so that one is passing the light when the other is interrupting and vice versa.

References Cited

UNITED STATES PATENTS

| | | | |
|---|---|---|---|
| 3,152,222 | 10/1964 | Loebner | 250—213 |
| 3,201,630 | 8/1965 | Orthuber et al. | 250—213 |
| 3,370,172 | 2/1968 | Hora | 250—213 |

RALPH G. NILSON, *Primary Examiner.*

M. J. FROME, *Assistant Examiner.*

U.S. Cl. X.R.

250—71, 213